United States Patent [19]

Friedland

[11] 4,243,324
[45] Jan. 6, 1981

[54] FEEDBACK SYSTEM FOR CONTROLLING LOCK-IN IN SPRING SUSPENDED RING LASER GYROSCOPE

[75] Inventor: Bernard Friedland, West Orange, N.J.

[73] Assignee: The Singer Company, Little Falls, N.J.

[21] Appl. No.: 22,557

[22] Filed: Mar. 21, 1979

[51] Int. Cl.³ ............................................. G01C 19/64
[52] U.S. Cl. .................................................... 356/350
[58] Field of Search ............................... 356/350, 351

[56] References Cited

U.S. PATENT DOCUMENTS

| 3,743,969 | 7/1973 | Hutchings | 356/350 |
| 4,132,482 | 1/1979 | Friedland | 356/350 |

Primary Examiner—Vincent P. McGraw
Attorney, Agent, or Firm—John C. Altmiller; Thomas W. Kennedy

[57] ABSTRACT

A system for offsetting lock-in in a spring-suspended ring laser gyroscope by dithering it by means of a torquer whose input is controlled by the sum of an analog positive-feedback signal for cancelling out losses due to damping and a piecewise-constant signal for adjusting the effective dither angular velocity phase in each cycle.

16 Claims, 6 Drawing Figures

FEEDBACK SYSTEM FOR CONTROLLING LOCK-IN IN SPRING SUSPENDED RING LASER GYROSCOPE

BACKGROUND OF THE INVENTION

1. Field of the Invention

This invention relates to spring suspended ring laser gyroscopes and, more particularly, to an improved method of producing dither in such a gyroscope through the use of feedback.

2. Description of the Prior Art

A variety of types of ring laser gyroscope have been developed. Typical is the apparatus disclosed in U.S. Pat. No. 3,373,650 where a ring laser gyroscope is shown which employs monochromatic beams of light traveling in two opposite directions around a closed loop path about the axis of rotation. Turning the apparatus about the axis of rotation causes the effective path length for each beam to change and results in oscillation at different frequencies in the beams since the frequency of oscillation of a laser is dependent upon the length of the lasing path. The two waves may be combined to generate interference patterns from which a measure of the rotational rate about the axis can be obtained. As was explained in the patent, the difference in frequency between the two beams at low rotational rates is small and they tend to resonate together, or to "lock in", and to oscillate at only one frequency. Therefore, low rotation rates cannot be detected. In U.S. Pat. No. 3,373,650, a solution to this problem is provided in which the apparatus is oscillated or "dithered" to avoid lock-in of the two beams. Another structure of this kind is disclosed in U.S. Pat. No. 3,467,472 and a detailed explanation of the problem and of various proposed solutions is contained in U.S. Pat. No. 3,879,130. The latter patent takes a different approach to the problem and describes the use of a saturable absorber placed in the ring laser cavity as a means of solving it. The dither systems just described are mechanical in nature and their operation has been "open loop". An improved system, employing feedback, is described in U.S. Pat. No. 4,132,482. This system, while successful to a large degree in reducing the amount of residual lock-in remaining in the system and resulting in less error than the open loop dithering systems described above, has the disadvantage that it cannot be used with a spring suspension system, such as that shown in U.S. Pat. No. 3,373,650, because an inordinately large amount of power would have to be supplied by the torquer in order to force a change in the dither frequency determined by the inertia of the gyroscope and the torsional spring.

A subsequent invention described in U.S. Patent Application Ser. No. 22,549 filed concurrently herewith in the name of Bernard Friedland and entitled LOCK-IN CONTROL SYSTEM FOR SPRING SUSPENDED RING LASER GYROSCOPE, is intended to be used with a spring suspension and is effective for moderate angular velocity inputs. In it, a feedback system generates torquing commands which tend to change the dither frequency. As the input angular velocity is decreased, the dither frequency is decreased. This is accomplished by the use of torquing signals which increase in amplitude with decreasing input angular velocity. Any source of torque is limited in amplitude, however, and so cannot produce the torque that the control system commands at very small angular velocity inputs. This "saturation effect" places a lower practical limit on the angular velocity input with which the gyro will operate.

It is an object of the present invention to provide a solution to this problem which does not require the application of inordinately large torque inputs.

SUMMARY OF THE INVENTION

The present invention overcomes the problem outlined above through control of the input to the dither torquer by means of a feedback system having a feedback signal which is based on the gyro optical phase and which is computed only once in each dither cycle, being then held constant throughout the cycle. This has the effect of changing the phase of the dither cycle without significantly changing the amplitude. Very large torques are not required even at very low angular velocity inputs; the system is therefore effective at very low angular velocity inputs.

The system employs a torquer controlled by means of a feedback control unit having inputs derived from the gyro optical phase angle, the dither angular velocity, and the dither angle. The feedback control unit produces a torque command signal having an analog feedback component for cancelling losses due to damping and another component calculated periodically and held constant for one or more dither cycles for adjusting the phase of the dither angular velocity. The control unit can be constructed using analog or digital components, or a combination thereof.

DETAILED DESCRIPTION OF THE INVENTION

Figure 1:
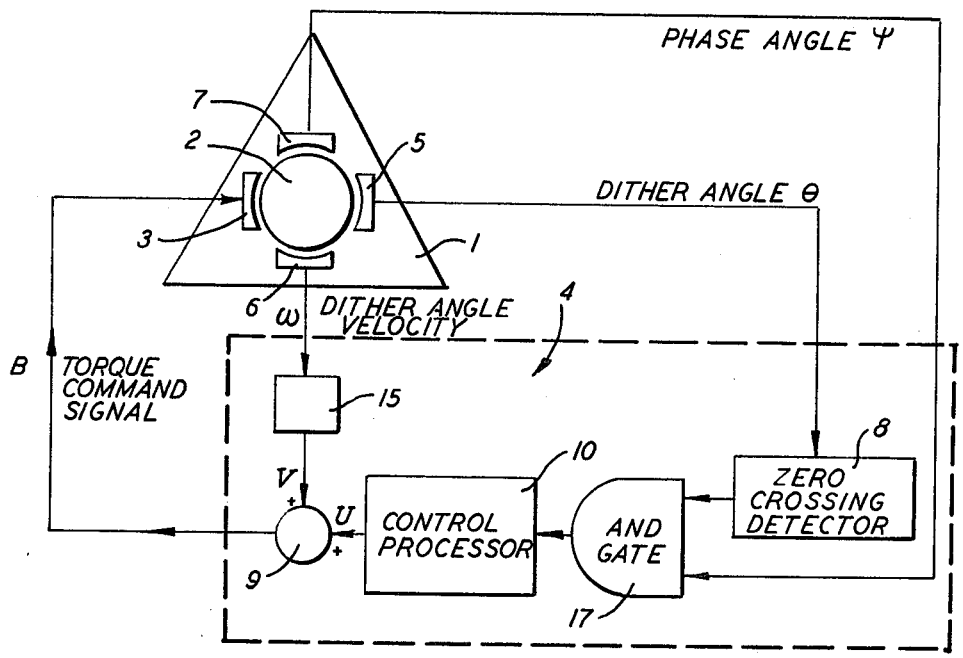
FIG. 1 is a schematic diagram illustrating the flow of information in a system for regulating the dither of a spring suspended laser gyroscope in accordance with the invention.

FIG. 1 is a diagram illustrating the flow of information in a system, as taught by the invention, for controlling the input to a dither torquer by means of feedback. In it, a ring laser gyro sensitive element 1 responds to an external angular velocity $\omega_I$ and an imposed dither angular velocity $\omega$, which is the angular velocity of sensitive element 1 relative to its case. Ring laser gyro sensitive element 1 is supported in its case (not shown) by resilient spring suspension 2 which has low damping and which oscillates nearly sinusoidally, at a natural resonant frequency of $\Omega$(rad/sec). Characteristically, little energy is required to maintain oscillation of such suspension systems. Drive system 3, which may be a torquer of a kind well known in the art, such as a piezo-electric transducer or an electromagnet, produces a control torque $L_{TOT}$. Drive system 3 acts as a gain element and the control torque $L_{TOT}$ is thus equal to a constant times the electrical command signal C supplied to the drive system input. Command signal C is computed in a feedback control unit 4, the inputs to which are the optical phase angle $\psi$, the dither angular velocity $\omega$, and the dither angle $\theta$. The latter signals are generated by sensors 5, 6, 7, respectively, which are associated with, and driven by, ring laser gyro sensitive element 1 in a manner well known in the art. The optical phase angle $\psi$ may be measured by an optical pick-off; the dither angular velocity $\omega$ may be read by a tachometer or a piezo-electric transducer; and the dither angle $\theta$ may be read optically or by means of a piezo-electric transducer.

Feedback control unit 4 produces the torque command signal C as the sum of two signals V and U. The signal V is a continuous analog positive-feedback signal proportional to dither rate $\omega$ which exactly cancels out losses in the system due to damping. It is produced by amplifying the output of dither angular velocity sensor 6 in amplifier 15 to the level necessary for this purpose. It drives the gyro sensitive element at a constant amplitude and frequency of oscillation. The signal U, on the other hand, is computed once each dither cycle and held constant throughout the cycle, i.e., $$U(t) = U_n = \text{const. for } nT \leq t \leq (n+1)T \tag{1}$$

where $T = 2\pi/\Omega$. The purpose of the addition of the "piecewise-constant" U(t) to the signal V is to adjust the effective dither angular velocity phase in each cycle relative to the optical phase at the beginning of the dither cycle. A dither cycle begins at the instant when the dither angle crosses through zero in the upward direction, and the optical phase at that instant, $$\psi_n = \psi(nT), \tag{2}$$

is used to determine the control signal $U_n$ as explained below. The optical phase at the beginning of a dither cycle is obtained by applying the output of zero crossing detector 8, which senses the point at which the dither angle crosses through zero, to AND gate 17 and causing readout of the optical signal 7, which is applied to the other input of AND gate 17. The phase $\psi_n$ is thus obtained at the beginning of the dither cycle. The phase angle $\psi_n$ is fed to a microcomputer 10 which performs the computation described below and generates the piecewise-constant signal U(t). The process of addition of analog positive-feedback signal V and piecewise-constant signal U is symbolically illustrated as occurring at summing junction 9.

Figure 2:
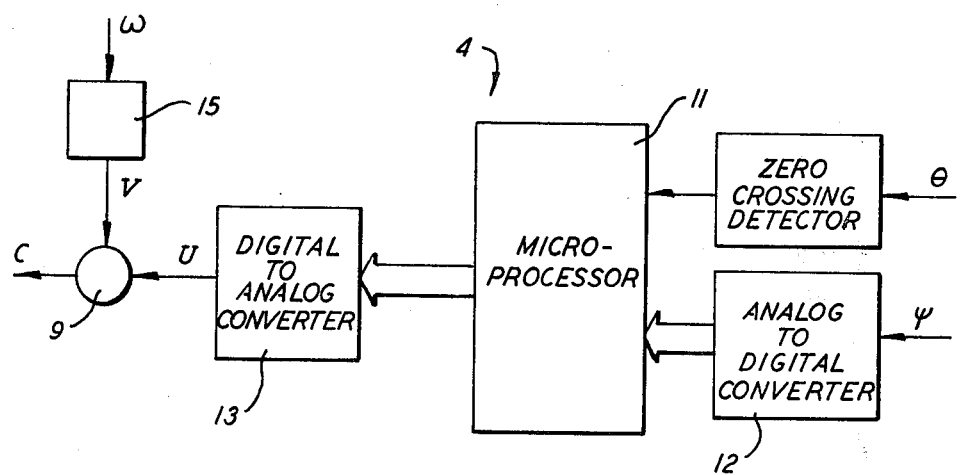
FIG. 2 is a schematic diagram of a feedback control unit which employs a microprocessor and which is useful in the circuit of FIG. 1.
Figure 3:
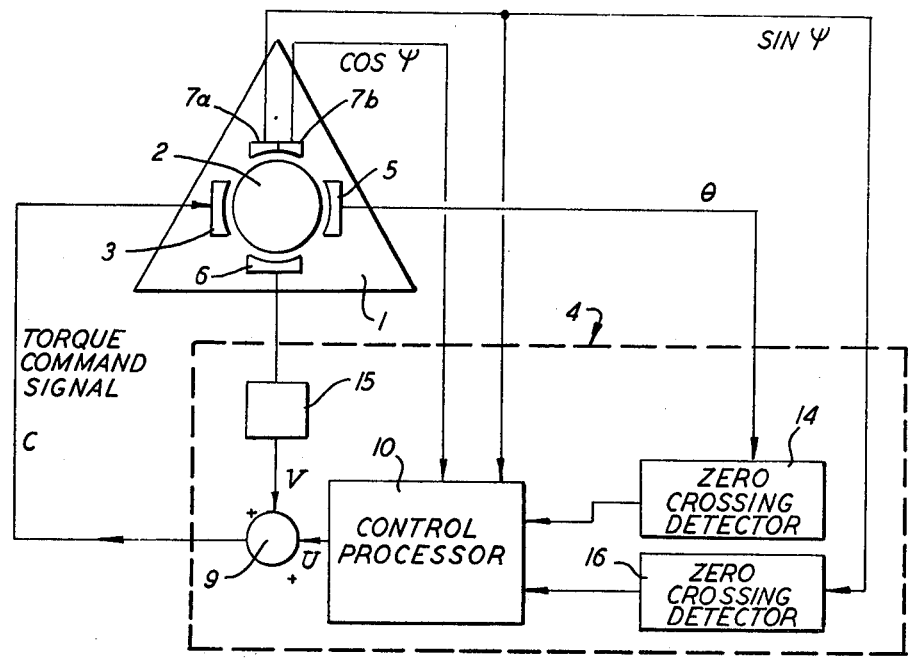
FIG. 3 is a schematic diagram of an alternative control system.
Figure 4:
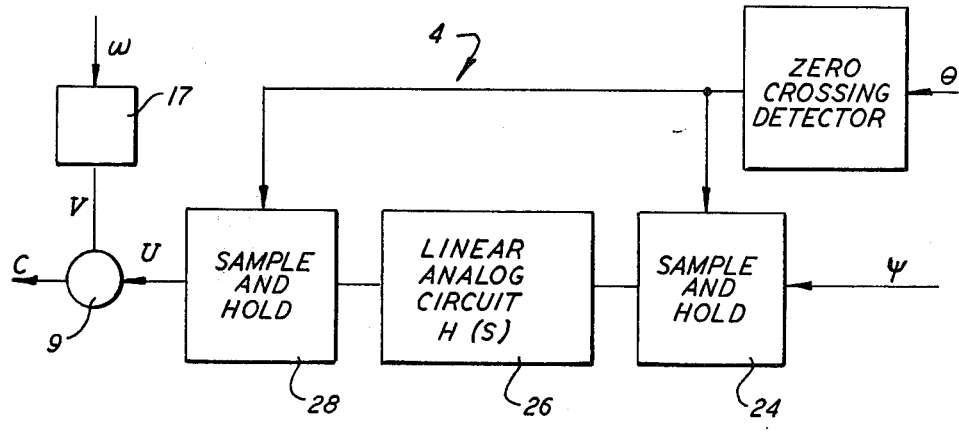
FIG. 4 is a schematic diagram of a feedback control unit useful in the circuit of FIG. 1 and employing an analog computer.

Alternative implementations of feedback control unit 4 are shown in FIGS. 2, 3 and 4 which will be described after the following discussion of the principle of operation of the invention.

The optical angle $\psi$ of a ring laser gyro satisfies the first-order differential equation $$d\psi/dt = G[\omega_I + \omega - \omega_L \sin \psi] \tag{3}$$

where
$\omega_I$ is the angular velocity of the gyro case (i.e., the external angular velocity)
$\omega$ is the dither angular velocity (i.e., the angular velocity of the sensitive element relative to the case)
$\omega_L$ is the lock-in frequency
G is the gyro scale factor.

In the resonant suspension, the dither angle $\theta$ and the dither angular velocity $\omega$ are given by $$d\theta/dt = \omega \tag{4}$$

$$d\omega/dt = -\Omega^2\theta - B\omega + (L_{TOT}/J) \tag{5}$$

where
$\Omega$ is the resonant frequency of the suspension
B is the damping of the suspension
J is the inertia of the sensitive element block
$L_{TOT}$ is the torque produced by the drive system
that is:

$$L_{TOT} = KC = K(V + U) \tag{6}$$

where K is the drive system (torquer) scale factor. The positive feedback signal V is chosen to exactly cancel the damping term, i.e., $$KV/J = B \tag{7}$$

and hence (5) becomes $$d\omega/dt = -\Omega^2\theta + L/J \tag{8}$$

where L is the torque produced by the piecewise-constant signal u.

For ease of analysis it is convenient to normalize the dynamic equations (3)–(5), introducing the following new, dimensionless, variables:
$\delta = G\theta =$ optical dither angle
$a_I = G\omega_I/\Omega =$ normalized input rate
$a = G\omega/\Omega =$ normalized dither rate
$a_L = G\omega_L/\Omega =$ normalized lock-in rate
$u = G/2 \ L/J = G/\Omega 2 \ K/J \ U =$ normalized control signal
$\tau = \Omega t =$ normalized time In terms of these nondimensional variables, equations (3), (4) and (8) become, respectively, $$d\psi/d\tau = a_I + a - a_L \sin \psi \tag{9}$$

$$d\delta/d\tau = a \tag{10}$$

$$da/d\tau = -\delta + u \tag{11}$$

Let $$\left. \begin{array}{l} \delta_n = \delta(2\pi n) = \text{normalized dither angle} \\ a_n = a(2\pi n) = \text{normalized dither rate} \end{array} \right\} \begin{array}{l} \text{at beginning of} \\ \text{nth dither cycle.} \end{array}$$

Consistent with equation (1), u is a piecewise-constant:

$$u(\tau) = u_n \text{ for } 2\pi n \leq \tau \leq 2\pi(n+1)$$

And, using standard methods, the solution to (10) and (11) over the nth dither cycle is found to be $$\delta(\tau + 2\pi n) = \delta_n \cos \tau + a_n \sin \tau + u_n(1 - \cos \tau) \tag{12}$$

$$a(\tau + 2\pi n) = -\delta_n \sin \tau + a_n \cos \tau + u_n \sin \tau \tag{13}$$

Thus, at the end of the nth dither cycle, which is the beginning of the (n+1)st cycle, $$\delta_{n+1} = \delta(2\pi 2\pi n) = \delta_n$$

$$a_{n+1} = a(2\pi + 2\pi n) = a_n$$

Thus the dither angle and dither angular velocity at the end of the cycle return to their values at the beginning of the cycle. Within the cycle, however, the normalized dither rate as given by (13) can be written $$a(\tau + 2\pi n) = A_n \cos(\bar\tau - \beta_n) \qquad (14)$$

where $$A_n = \sqrt{a_n^2 + (u_n - \delta_n)^2} \qquad (14)$$
$$\tan\beta_n = \frac{u_n - \delta_n}{a_n}$$

Thus it is observed that the effective amplitude $A_n$ and phase $\beta_n$ of the dither signal can be controlled by the piecewise-constant control signal u.

Although the beginning of the dither cycle can be defined as $\delta_n = \delta_{n+1} =$ any angle, it is most practical to assume that the dither cycle starts at $\delta_n = \delta_{n+1} = 0$ as determined by the zero-crossing detector. In this case $$A_n = \sqrt{a_n^2 + u_n^2} \qquad (15)$$
$$\tan\beta_n = \frac{u_n}{a_n} \qquad (16)$$

It should be noted that a small control signal u ($u_n < < a_n$) affects mostly the phase and has only a slight effect on the amplitude, i.e., $$\beta_n \approx (u_n/a_n)$$

$$A_n \approx a_n$$

Substitution of (14) into (9) gives $$\frac{d\psi}{d\tau} = a_I + A_n \cos(\bar\tau - \beta_n) - a_L \sin\psi \qquad (17)$$

where $\bar\tau$ in (17) is the time into the nth dither cycle ($\bar\tau = \tau - 2\pi n$).

An exact solution to (17), which is a nonlinear differential equation, has not been found. But, by numerical integration over a single dither cycle with many different values of the optical phase angle at the beginning of the dither cycle, namely:

$$\psi(\bar\tau = 0) = \psi(\tau = 2\pi n) = \psi_n$$

and many parameter values $a_I$, $A_n$, $\beta_n$, $a_L$, it has been established that the solution of (17) over one dither cycle is well-approximated by an expression of the form:

$$\psi_{n+1} - \psi_n = \qquad (18)$$

$$2\pi a_I - f_1(a_L, A_n, a_I) + f_2(a_L, A_n, a_I)\sin\left(\frac{\psi_{n+1} + \psi_n}{2} + A_n \sin\beta_n\right)$$

where $f_1(a_L, A_n, a_I)$ and $f_2(a_L, A_n, a_I)$ are constants that depend on $a_L$, $A_n$, and $a_I$ and are determined empirically by the numerical integration of (17).

Equation (18) is the key to the control system design. In an ideal gyro the change in readout angle over one dither cycle should be exactly $2\pi a_I$; thus the $f_1$ and $f_2$ terms result in errors. Since the $f_2$ term is controllable (through $A_n$ and $\beta_n$) by controlling $u_n$, it is possible to select $U_n$ so as to eliminate the errors by making the $f_1$ term cancel the $f_2$ term, that is, to pick $A_n$ and $\beta_n$ such that $$f_1(a_L, A_n, a_I) = f_2(a_L, A_n, a_I)\sin\left(\frac{\psi_n + 2\pi a_I + \psi_n}{2} + A_n \sin\beta_n\right)$$

or $$\frac{f_1(a_L, A_n, a_I)}{f_2(a_L, A_n, a_I)} = \sin(\psi_n + \pi a_I + A_n \sin\beta_n) \qquad (19)$$

No solution to this equation exists for $|f_1/f_2| > 1$. But for practical values of $a_L$ and $A_n$ (with $A_n >> a_L$) the ratio of $f_1$ to $f_2$ is found to be much smaller than unity, and (19) can be solved. The solution sought is:

$$\psi_n + \pi a_I + A_n \sin\beta_n = \sin^{-1}\left(\frac{f_1(a_L, A_n, a_I)}{f_2(a_L, A_n, a_I)}\right) \pm 2\pi k$$

Now, from (15) and (16), $$A_n \sin\beta_n = u_n$$

Hence, the normalized control signal $u_n$ that cancels the error is given by $$u_n = -\psi_n - \pi a_I + \sin^{-1}\frac{f_1(a_L, A_n, a_I)}{f_2(a_L, A_n, a_I)} \pm 2\pi k \qquad (20)$$

Theoretically k in (20) can be any integer. But, for the practical reason of minimizing the control amplitide, k is chosen to keep $u_n$ between $-\pi$ and $\pi$.

Since $A_n$ depends (slightly) on $u_n$, (20) must be regarded as an implicit equation of $u_n$. But, since $f_1/f_2$ is quite small in most cases, it may be permissible to approximate $\sin^{-1}(f_1/f_2)$ by $f_1/f_2$ and to use $a_n$ instead of $A_n$ in the approximation. This yields the simpler control expression.

$$u_n = -\psi_n - \pi a_I + \frac{f_1(a_L, a_n, a_I)}{f_2(a_L, a_n, a_I)} \pm 2\pi k \qquad (21)$$

The normalized input angular $a_I$ appears in (20) and (21). But if this quantity were known, there would be no need for the gyro in the first place. Thus, in the implementation, use is made of an estimated value of $a_I$ in place of the true value which is not known except through the operation of the instrument. If the instrument is properly operating and the sensor output of optical phase angle is relatively noise free, then a valid estimate $\hat{a}_{In}$ of $a_I$ is given by $$\hat{a}_{In} = (1/2\pi)(\psi_n - \psi_{n-1}) \qquad (22)$$

More generally, assuming that noise is present in the measurement of $\psi_n$, a "Kalman filter" can be constructed to obtain a smoothed value $\hat\psi_n$ of the readout angle together with an estimate $\hat{a}_{In}$. Applying well-known Kalman filtering theory yields the estimation equations:

$$\hat\psi_n = \tilde\psi_n + K_\psi(\bar\psi_n - \tilde\psi_n) \qquad (23)$$

$$\hat{a}_{In} = \hat{a}_{I(n-1)} + K_a(\bar{\psi}_n - \hat{\psi}_n) \qquad (24)$$

with $$\hat{\psi}_n = \hat{\psi}_{n-1} + 2\pi \hat{a}_{I(n-1)} \qquad (25)$$

where $$\bar{\psi}_n = \text{noisy readout} = \psi_n + \text{noise}$$

The constants $K_\psi$ and $K_a$ are constant filter gains that depend on the noise standard deviation. As the noise standard deviation tends to zero, $K_\psi \to 1$ and $K_a \to 1/2\pi$. Then (23) becomes $$\hat{\psi}_n = \bar{\psi}_n$$

and (24) reduces to (22). The gains $K_\psi$ and $K_a$ are computed using well-known Kalman filtering theory. A graph showing the optimum relationship between $K_\psi$ and $2\pi K_a$, which results from using this theory, is given in FIG. 6. The smaller values of $K_a$ and $K_\psi$ would tend to give more noise filtering, at the expense of more sluggish dynamic response, than would be obtained with the higher gains. Equations (23)–(25) along with (20) or (21), can be implemented in a microcomputer.

The actual torque required is computed from $u_n$ using the definition given earlier, i.e., $$U_n = (J\Omega^2/GK)u_n \qquad (26)$$

or, substituting the optimum estimates (23) through (25) into (21), and the result into (26) gives $$U_n = \frac{J\Omega^2}{GK} [-\hat{\psi}_n - \pi \hat{a}_{In} + \frac{f_1(a_L, a_n, \hat{a}_{In})}{f_2(a_L, a_n, \hat{a}_{In})} \pm 2\pi k]$$

It will be understood by those skilled in the art that the illustrative embodiment of the invention described in connection with FIG. 1 can be implemented in other ways. Also, it will be understood that it is not necessary for the change in optical pulse angle over one cycle to be that given by equation (18) in order for the invention to be practised. A more general functional dependence can be accommodated. In particular, any solution to (17) can be written as $$\psi_{n+1} - \psi_n = 2\pi a_I + E(a_L, A_n, a_I, \psi_{n+1}, \psi_n, \beta_n) \qquad (27)$$

where E is whatever function results from numerical integration of (17). In order to cancel the error, it is necessary to select $A_n$ and $\beta_n$ such that $$E(a_L, A_n, a_I, \psi_n + 2\pi, \psi_n, \beta_n) = 0 \qquad (28)$$

This is an implicit function, which, together with (15) and (16) determines the required control. Equations (20) and (21) are special cases of this more general equation.

The feedback control unit 4 of FIG. 1 can be implemented by using a microprocessor as shown in FIG. 2. There, a microprocessor 11 which contains or works with enough memory to accommodate the control program (less than 1K bytes), an analog-to-digital converter 12, and a digital-to-analog converter 13 are provided. If the microprocessor chip does not include a clock, it will be understood by those skilled in the art that one must be supplied. For the sake of simplicity, DC power connections are omitted. The function of the AND gate 9 of FIG. 1 is included in the operation of the microprocessor; therefore a separate AND gate is not needed.

The signal from the zero-crossing detector serve as an interrupt signal. Prior to the occurrence of this signal, the processor is programmed to execute an arbitrary "background" program "A" (a NO-OP loop, for example). The analog phase signal $\psi$ from gyro optical readout 7 (FIG. 1) is connected to the input of analog-to-digital converter chip 12, where it is continuously converted to digital format. In digital form, it is connected to an input port of microprocessor 11. The output of the microprocessor is simultaneously the previously computed control signal, fed (in digital form) to digital-to-analog converter 13. There, a constant correction value U is generated until the occurrence of the next interrupt signal from the zero-crossing detector.

Upon the occurrence of the interrupt signal, the microprocessor executes the control program. Because calculation of a new control signal $U_n$ by the microprocessor may require an appreciable fraction of a dither cycle for completion, a filter which accounts for a full dither cycle of delay is employed instead of that described by equations 23 through 25 above. The equations for this filter are $$\hat{\psi}_n = \hat{\psi}_{n-1} + 2\pi \hat{a}_{n-1} + \bar{K}_\psi(\bar{\psi}_{n-1} - \hat{\psi}_{n-1}) \qquad (29)$$

$$\hat{a}_n = \hat{a}_{n-1} + \bar{K}_a(\bar{\psi}_n - \hat{\psi}_{n-1}) \qquad (30)$$

Figure 6:
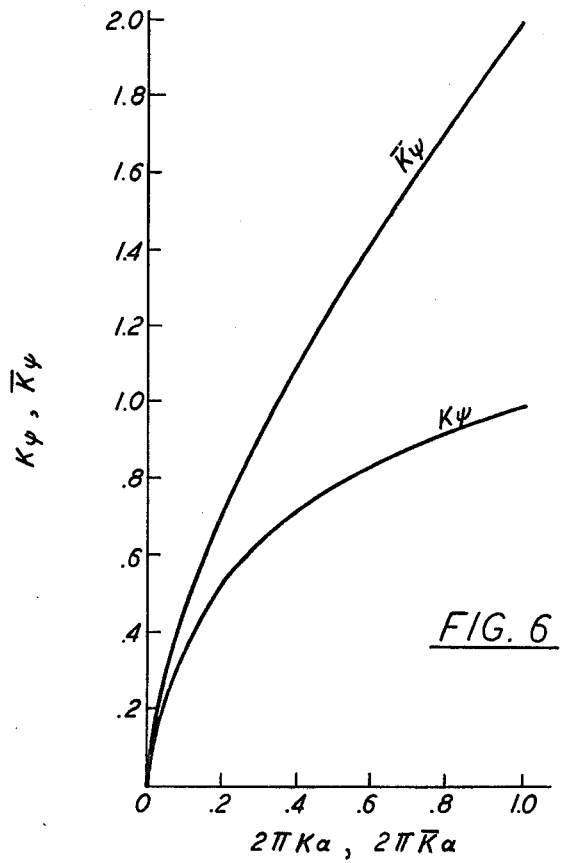
FIG. 6 is a graph of the optimum relationship between constant Kalman filter gains useful in computing the piecewiseconstant component of the feedback signal.

The gains $\bar{K}_\psi$ and $\bar{K}_a$ are not the same as $K_\psi$ and $K_a$, respectively, in Equations (23) and (24) and are also seen in FIG. 6. The mathematical routine at STEP 3 of the computer program that follows corresponds to Equations (29) and (30) instead of Equations (23) through (25).

Upon the occurrence of the interrupt signal from the zero crossing detector, the microprocessor executes the control program which consists of the following steps:

STEP 1. The digital representation of the optical phase signal $\psi$ is transferred from the input port to a memory location.

STEP 2. The previously computed control signal, currently in memory, is transferred to the output port (where it is immediately converted to analog form).

STEP 3. A mathematical control routine is executed which computes a new control signal and retains it in memory until the next interrupt signal arrives.

STEP 4. The computer is returned to execute the arbitrary program "A" or simply remains in a "wait for interrupt" condition.

It is noted that the first two operations are performed in a few machine cycles and hence the time-delay between the occurrence of the zero-crossing interrupt, the reading of the phase, and the updating of the output is negligible. The time interval of almost a full dither cycle (of the order of 4 to 5 milliseconds) is available for executing the mathematical routine at STEP 3. In view of the simplicity of the required operations, this is ample time to perform the calculations. On the basis of the analysis a sequence of calculations must be performed as given by the following mathematical routine:

| | |
|---|---|
| 1 | R = P − PH |
| 2 | PH = PH + TP*AH + K*R |
| 3 | AH = AH + KA*R |
| 4 | U = −PH − F*AH |
| 5 | IF U < PI GO TO 8 |

```
6      IF U >PI THEN U = U − TP
7      RETURN
8      U = U + TP : RETURN
```

This sequence of operations is expressed in BASIC language in which

| | | |
|---|---|---|
| R | represents | $r_n$ (an intermediate program variable) |
| P | " | $\psi_n$ |
| PS | " | $\dot{\psi}_n$ |
| PH | " | $\hat{\psi}_n$ |
| AH | " | $\hat{a}_n$ |
| U | " | $u_n$ |
| PI | " | $\pi$ |
| TP | " | $2\pi$ |
| F | " | $\pi + c$ |
| K | " | $K_p$ |
| KA | " | $K_a$ | where, in (21)

$$f_1/f_2 \approx ca_I$$

(Experience has shown this to be a good approximation.)

It should be noted that the above mathematical routine is expressed in BASIC language only for purposes of explanation. It will be understood that the program would be appropriately coded in the machine code for the microprocessor chip being used. Also, it should be noted that it may be desirable to scale the variables to achieve maximum programming efficiency and to use the analog-to-digital converter most efficiently.

FIG. 3 shows an embodiment of the invention which illustrates the use of the commonly employed "fringe pattern" detector type of readout of ring laser gyro 1 in place of the optical phase angle $\psi$ discussed previously.

In this case, the readout detector, shown schematically, is divided into two portions, one of which, 7a, generates a signal proportional to the sine of $\psi$ and the other, 7b, to the cosine of $\psi$, i.e.:

$$s(t) = K_1 \sin \psi(t) \tag{31}$$

$$c(t) = K_2 \cos \psi(t) \tag{32}$$

where $K_1$ and $K_2$ are known constants of proportionality.

FIG. 3 also illustrates a method of determining the phase $\psi$, at the instant of the fringe crossing, which is based on the use of two zero crossing detectors. In it, zero crossing detector 14, responding to dither angle $\theta$, is used to start a digital "clock" in microprocessor 10 or a separate digital clock and the zero crossing signal from zero crossing detector 16 is used to stop the "clock". For this purpose, zero crossing detector 16 is supplied with the signal sin $\psi$ from detector 7b. The time difference between the zero crossings, as measured by the clock, is proportional to the phase angle $\psi$ at the instant that the dither angle $\theta$ crosses through zero. The value so achieved may be processed, as before, in the microprocessor to produce a control value U.

The proportionality of the phase angle $\psi$ to the difference in time of zero crossings can be seen from the following analysis:

At the instant $t_0$ that the dither angle $\theta$ crosses through zero, the total angular velocity input is maximum and the gyro is not locked. The total angular velocity is $\Omega + \Omega_i$; but $\Omega$ is much greater than $\Omega_i$, so the angular velocity can be assumed to be $\Omega$. Thus, $$\psi(t) \doteq \psi(t_0) + \Omega(t - t_0) \tag{33}$$

and hence $$s(t) = K_2 \sin[\psi(t_0) + \Omega(t - t_0)]. \tag{34}$$

At the instant T of zero crossing s(T)=0 and hence $$\psi(t_0) + \Omega(T - t_0) = 0 \tag{35}$$

Thus the required phase angle for the control law $\psi(t_0)$, the phase angle at the time of dither zero crossing, is given by $$\psi(t_0) = -\Omega(T - t_0) = \Omega \Delta, \tag{36}$$

where $\Delta = T - t_0$ is the time between the zero crossing of the dither signal and the zero crossing of the final detector signal s(t). The signal c(t) is used to resolve the quadrant of $\psi(t)$.

Another method of using the signals s(t) and c(t) is to convert them to digital format and then to use the background program "A" to perform a table-look-up of the angle $\psi$ using the digital representations of s(t) and c(t). One skilled in machine language programming can readily write such a program; since the program would be highly dependent on the available instruction set, the specification of such algorithm in a higher-order language such as BASIC as was done for the control program described above is not being undertaken here.

FIG. 4 illustrates the use of an analog signal processor instead of a microprocessor to perform the functions of the feedback control unit 4 of FIG. 1. In this embodiment of the invention, two "sample-and-hold" circuits 24 and 28 are connected on either side of linear analog circuit 26. Sample-and-hold circuits 24 and 28 are activated by an interrupt signal generated, as before, by zero crossing detector 8, from dither angle $\theta$. The interrupt signal causes sample and hold circuit 24 to determine the value of optical phase $\psi$ at the time of the zero crossing and to retain it until the next zero crossing of the dither signal. The signal thus held and appearing at the output of sample-and-hold circuit 24 is fed to the input of linear analog circuit 26 (see FIG. 5) which has a transfer function H(s). The output of analog circuit 26 is fed to the second sample-and-hold circuit 28 where it is held and made available as correction signal U.

The operation of the circuit of FIG. 4 may be characterized by the "pulse transfer function", $$H(z) = U(z)/\Psi(z) \tag{37}$$

where U(z) and $\psi$(z) are Z-transforms of the output signal U and the optical phase signal $\psi$. Z-transforms are defined in textbooks such as "Sampled-Data Control Systems" by J. R. Ragazzini and G. F. Franklin, published by McGraw Hill in 1958.

In accordance with well-known theory, the pulse transfer function is given by $$H(z) = (1 - z^{-1})\xi\left\{\frac{H(s)}{s}\right\} \tag{38}$$

where represents the operation of taking Z-transform on a sampled-data system.

The required pulse transfer function H(z) is determined by Z-transforming the difference equations that describe the data processing algorithm. Once the required transfer function H(z) is determined H(s) can be found and synthesized by well-known methods. In case of the algorithm defined by Equations (29) and (30) with the control signal given by $$u_n = -\hat{\psi}_n - F\hat{a}_{In} \tag{39}$$

Then $$U(z) = -\hat{\Psi}(z) - F\hat{A}_I(z) \tag{40}$$

and, on taking the Z-transforms of Equations (29) and (30) one obtains $$\hat{\Psi}(z) = z^{-1}[\hat{\Psi}(z) + 2\pi\hat{A}_I(z) + \overline{K}_\psi(\Psi(z) - \hat{\Psi}(z))] \tag{41}$$

$$\hat{A}_I(z) = z^{-1}[\hat{A}_I(z) + \overline{K}_a(\Psi(z) - \hat{\Psi}(z))] \tag{42}$$

Upon solution of these equations for $\hat{\psi}(z)$ and $\hat{A}_I(z)$, and substitution into the expression for U(z) we get $$\frac{U(z)}{\Psi(z)} = H(z) = \frac{b_1 z + b_2}{z^2 + a_1 z + a_2} \tag{43}$$

where $$a_1 = -2 + \overline{K}_\psi$$

$$a_2 = 1 - \overline{K}_\psi + 2\pi\overline{K}_a$$

$$b_1 = -\overline{K}_\psi - F\overline{K}_a$$

$$b_2 = \overline{K}_\psi + F\overline{K}_a - 2\pi\overline{K}_a$$

An analog transfer function H(s) which synthesizes this pulse transfer function is second order and has the general transfer function $$H(s) = \frac{\beta_1 s + \beta_2}{s^2 + \alpha_1 s + \alpha_2} \tag{44}$$

The relationships between $\alpha_1$, $\alpha_2$, $\beta_1$, $\beta_2$, and $a_1$, $a_2$, $b_1$, $b_2$ can be determined with the aid of a table of Z transforms.

Figure 5:
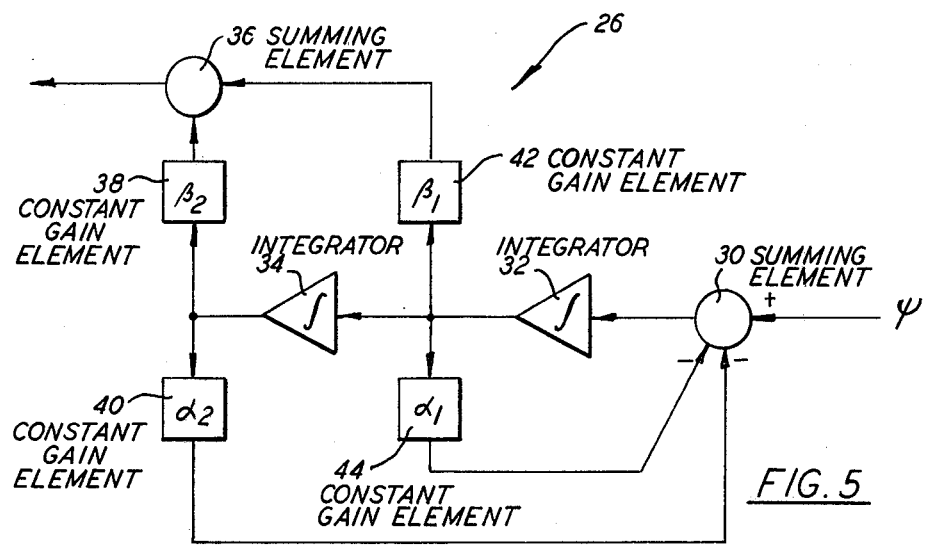
FIG. 5 is a schematic diagram of a linear analog circuit for use in the apparatus of FIG. 4.

FIG. 5 shows a linear analog circuit 26 in which the transfer function H(s) required in FIG. 4 can be synthesized. In it, the value of optical phase $\psi$ held in sample-and-hold circuit 24 is fed to a first summing element 30 which may comprise an amplifier having multiple input resistors. The output of summing element 30 is fed to integrator 32, the output of which, in turn, is supplied to integrator 34. Integrators 32 and 34 may each comprise an operational amplifier having a resistor input and capacitor feedback, as is well-known in the art. The output of integrator 34 is fed, through constant gain element 38, to one input of a second summing element 36, which may also comprise an amplifier having resistances in the input circuits. The output of integrator 32 is also processed through constant gain elements 42 and 44 and supplied to the inputs of summing elements 36 and 30. The output of integrator 34 is also fed, via constant gain element 40 to summing element 30. Constant gain elements 38, 40, 42 and 44 may comprise potentiometers when gains less than unity are needed, or amplifiers, where gains of more than unity are needed. In the case of constant gain elements 40 and 44, the use of inverting amplifiers may be preferred in order to conveniently provide inverted signals to the inputs of summing element 30. Also, as will be apparent to those skilled in the art, some functions can be combined. Thus, summing element 36 and constant gain elements 38 and 42 can be implemented by means of a single operational amplifier and two input resistors and summing element 30 can be combined with integrator 32.

In instances where the phase signal $\psi$ at the instant of dither zero crossing is not available, the signal for the zero crossing of the fringe pattern described above may be used. Instead of starting a clock, the zero crossing of the dither signal may be used to trigger an integrator and the zero crossing of the fringe signal used to stop the integration. The analog signal generated at the integrator output when the integration is stopped is proportional to the phase shift $\psi$ and would be supplied to the input of linear analog circuit 26 of FIG. 4.

What is claimed is:

1. In combination with a spring suspended ring laser gyroscope for providing a gyroscope readout which is proportional to angular input, the gyroscope being suspended by springs from a support;
   a torquer for dithering the gyroscope relative to the support in response to a control signal;
   means for measuring the optical phase angle of the gyroscope and providing a signal proportional thereto;
   means for measuring the movement of the gyroscope relative to the support and providing a signal proportional to dither angle and a signal proportional to dither angular velocity;
   a feedback unit for generating a control signal which is a function of the optical phase angle signal, the dither angle signal, and the dither angular velocity signal.

2. The apparatus of claim 1 in which the control signal includes a component which is proportional to dither angular velocity for offsetting system losses due to damping and a piecewise-constant component which is a function of the phase angle of the optical readout for adjusting the phase of the effective dither angular velocity relative to the optical phase angle.

3. The apparatus of claim 2 in which the piecewise-constant component is generated once for an integral number of cycles and held constant for a time interval equal to that of the integral number of cycles.

4. The apparatus of claim 2 in which the piecewise-constant is generated once each cycle and held constant.

5. Apparatus in accordance with claim 4 in which the piecewise-constant control signal component is generated in accordance with the formula $$U_n = \frac{J\Omega^2}{GK}\left[-\hat{\psi}_n - \pi\hat{a}_{In} + \frac{f_1(a_L, a_n, \hat{a}_{In})}{f_2(a_L, a_n, \hat{a}_{In})} \pm 2\pi k\right]$$

where
   $U_n$ is the value of the piecewise-constant component of torque throughout the nth dither cycle
   J is the inertia of the sensitive element block
   $\Omega$ is the resonant frequency of the suspension
   G is the gyro scale factor
   K is the drive system (torquer) scale factor
   $\hat{\psi}_n$ is an estimate of the optical pulse angle
   $\hat{a}_{In}$ is an estimate of the input rate $f_1$ is an empirically determined function of the arguments $a_L$, $a_n$, $a_I$ $f_2$ is an empirically determined function of the arguments $a_L$, $a_n$, $a_I$ $a_L$ is the normalized lock-in rate $a_n$ is the normalized dither amplitude k is an integer chosen to keep the quantity within the brackets between $-\pi$ and $\pi$.

6. An apparatus in accordance with claim 4 in which the feedback unit includes:

means for converting the gyro readout angle into a digital value proportional to phase, means including a microprocessor for computing the piecewise-constant component from the digital value once each dither cycle and for converting the digital output of the microprocessor into an analog control signal, and means responsive to the dither angle for initiating computation by the microprocessor once each dither cycle.

7. An apparatus in accordance with claim 4 in which the gyro readout angle is in the form of fringe detector signals proportional to the sine and cosine of the phase of the angle and the feedback unit includes:

means including a microprocessor for computing the piecewise-constant component from the fringe detector signals, for converting the computed signal to analog form, and for holding the computed signal constant, and means responsive to the dither angle for initiating computation in the microprocessor once each dither cycle.

8. An apparatus in accordance with claim 4 in which the feedback unit includes:

means for sampling the gyro readout and for providing a signal proportional to readout angle once each dither cycle, a linear analog circuit responsive to the output of the gyro sampling means for generating the piecewise-constant component, and means for sampling the output of the linear analog circuit once each dither cycle and holding that value constant.

9. The apparatus of claim 8 in which the analog circuit has the transfer function $$H(s) = \frac{\beta_1 s + \beta_2}{s^2 + \alpha_1 s + \alpha_2}$$

in which $\alpha_1$, $\alpha_2$, $\beta_1$ and $\beta_2$ are constants.

10. A method for dithering a ring laser gyroscope held in a support by a spring suspension to overcome lock-in which includes:

continuously measuring the dither angular velocity of the gyroscope, applying torque to the spring suspension of the gyroscope in proportion to the measured dither angular velocity for cancelling out system losses; and measuring the optical phase angle of the gyroscope and repeatedly adjusting the effective dither angle by applying additional torque to the spring suspension at a level which is a function of the measured optical phase angle and which is established once for an integral number of cycles.

11. The method of claim 10 in which the level is established once each cycle.

12. The method of claim 10 in which the level is a function of gyroscope readout phase angle.

13. The method of claim 11 in which the level of constant torque is computed from the equation:

$$U_n = \frac{J\Omega^2}{GK}\left[-\hat{\psi}_n - \pi\hat{a}_{In} + \frac{f_1(a_L, a_n, \hat{a}_{In})}{f_2(a_L, a_n, \hat{a}_{In})} \pm 2\pi k\right]$$

$U_n$ is the value of the piecewise-constant component of torque throughout the nth dither cycle J is the inertia of the sensitive element block $\Omega$ is the resonant frequency of the suspension G is the gyro scale factor K is the drive system (torquer) scale factor $\hat{\psi}_n$ is an estimate of the optical phase angle $\hat{a}_I$ is an estimate of the input rate $f_1$ is an empirically determined function of the arguments $a_L$, $a_n$, $\hat{a}_{In}$ $f_2$ is an empirically determined function of the arguments $a_L$, $a_n$, $\hat{a}_{In}$ $a_L$ is the normalized lock-in rate $a_n$ is the normalized dither amplitude k is an integer chosen to keep the quantity within the brackets between $-\pi$ and $\pi$.

14. The method of claim 12 including computing the signal for controlling the level of constant torque in a microprocessor having as an input, taken once each dither cycle, a signal proportional to the phase of the gyroscope readout angle.

15. The method of claim 12 including computing a signal for controlling the level of constant torque in an analog computer having as an input, taken one each dither cycle, a signal proportional to the phase of the gyroscope readout angle.

16. The method of claim 15 in which the analog computer has the transfer function $$H(s) = \frac{\beta_1 s + \beta_2}{s^2 + \alpha_1 s + \alpha_2}$$

in which $\alpha_1$, $\alpha_2$, $\beta_1$ and $\beta_2$ are constants.

* * * * *